(12) United States Patent
Feldbauer

(10) Patent No.: US 8,560,228 B2
(45) Date of Patent: Oct. 15, 2013

(54) SYSTEM FOR DISPLAYING POINTS OF INTEREST

(75) Inventor: Thomas Feldbauer, Regensburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 29 days.

(21) Appl. No.: 13/208,074

(22) Filed: Aug. 11, 2011

(65) Prior Publication Data

US 2012/0046861 A1 Feb. 23, 2012

(30) Foreign Application Priority Data

Aug. 18, 2010 (EP) ..................................... 10008611

(51) Int. Cl.
*G01C 21/30* (2006.01)
*G01C 21/32* (2006.01)

(52) U.S. Cl.
USPC ........................................... 701/426; 701/439

(58) Field of Classification Search
USPC .......... 701/212, 455, 465, 426, 438; 715/765, 715/766
See application file for complete search history.

(56) References Cited

U.S. PATENT DOCUMENTS

| 6,836,728 | B2 * | 12/2004 | Shimabara | ..................... 701/455 |
| 8,165,808 | B2 * | 4/2012 | Scheibe | ........................ 701/533 |
| 2003/0023374 | A1 | 1/2003 | Shimabara | ..................... 701/212 |
| 2009/0024315 | A1 | 1/2009 | Scheibe | ........................ 701/208 |
| 2009/0100363 | A1 * | 4/2009 | Pegg et al. | ...................... 715/765 |
| 2010/0057347 | A1 * | 3/2010 | Sugiyama et al. | ............ 701/204 |
| 2010/0058212 | A1 * | 3/2010 | Belitz et al. | .................... 715/766 |

FOREIGN PATENT DOCUMENTS

| JP | 2009258583 | 11/2009 | ............ G01C 21/00 |
| JP | 2009258583 A | * 11/2009 | |
| JP | 2012042950 A | * 3/2012 | |
| WO | WO 2010/022854 A1 | 3/2010 | ............ G01C 21/20 |

OTHER PUBLICATIONS

European Search Report dated Jan. 18, 2011, in European Application No. 10 00 8611.

* cited by examiner

*Primary Examiner* — Thomas Black
*Assistant Examiner* — Robert Payne
(74) *Attorney, Agent, or Firm* — Brinks Hofer Gilson & Lione

(57) ABSTRACT

A navigation system includes a display for displaying map sections and point of interest (POI) data to a user and a database for storing POI data. A retrieval unit is provided to retrieve from the database POI data for the map section to be displayed. The POI database includes POIs and substitute POIs representing a number of POIs in a map region. It may then depend on the map scale with which the map section is to be displayed whether a substitute POI or a POI which it represents is retrieved from the database.

20 Claims, 5 Drawing Sheets

SYSTEM FOR DISPLAYING POINTS OF INTEREST

PRIORITY CLAIM

This application claims the benefit of priority from EP 10 008 611.5, filed Aug. 18, 2010, which is incorporated by reference.

BACKGROUND OF THE INVENTION

1. Technical Field

The invention relates to a method of displaying points of interest (POIs) on a display of a navigation system which is capable of displaying maps at different map scales, and to a corresponding navigation system. The invention further relates to a data carrier including a point of interest (POI) database.

2. Related Art

In recent years, the use of navigation systems, such as simple handheld navigation devices or more complex in-vehicle systems, has been proliferating. With only few exceptions, navigation devices include a display on which map information is given out to a user. Some conventional devices are further capable of displaying points of interest (POIs) as part of the map information.

SUMMARY

A method of displaying points of interest (POIs) on a display of a navigation system includes determining a map section to be displayed at a particular map scale on the display and retrieving POI data for the map section to be displayed. Depending on the map scale, a POI located within the map section may be retrieved or a substitute POI representing that POI may be retrieved. The map section and the retrieved POI data are concurrently displayed on the display of the navigation device, with a substitute POI being displayed as a substitute for the POIs which it represents. A substitute POI can represent any number of POIs to avoid overcrowding of POI icons on the display.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
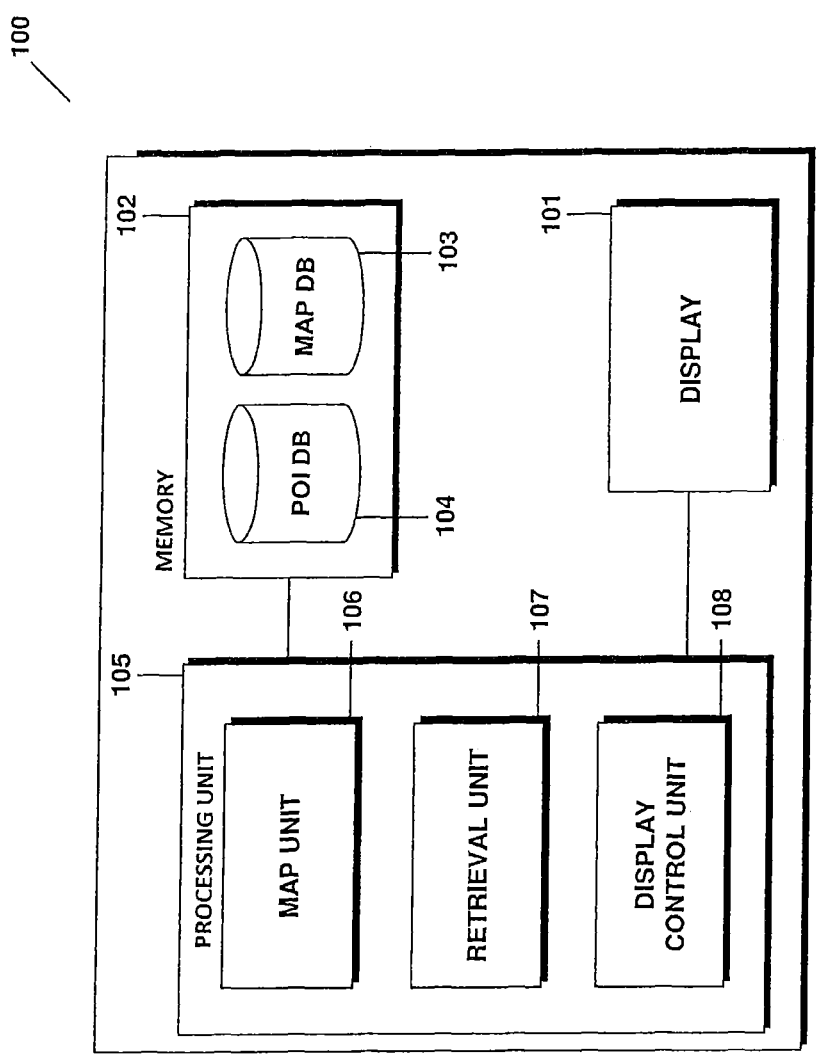
FIG. 1 shows a schematic drawing of an example of a navigation system.

A map displayed on a navigation device generally includes graphical indications of cities and roads linking the cities, the size of the city and the category of the road being indicated by the respective graphical symbol. To facilitate orientation and navigation, navigation devices are generally provided with a map display function that has several zoom levels, i.e. that is capable of displaying the map at different map scales. Generally, different categories of POIs are available for displaying, which can be chosen automatically or by user interaction. A category can for example be provided for airports, interesting sights, gas stations, restaurants, pharmacies, cinemas and the like. The user can thus be provided with useful information by displaying an icon representative of a POI at its location on the map. For the user, this facilitates choosing a travel path which passes a particular sight or restaurant or finding a path to a desired destination, e.g. the closest restaurant. In a city in which a plurality of POIs are present, the POIs of the selected categories can generally be displayed on the larger map scales without interfering with each other. For smaller map scales, i.e. if the user zooms out, a larger map section is displayed on the screen of the same size leading to an increased density of the displayed POI icons. This can result in overcrowding of the display, which essentially renders the displayed information useless.

This problem may be solved by assuming a certain density of a certain category of POIs on the map, which corresponds to an icon density on the display screen for a particular map scale. At a map scale at which the assumed density of the icons on the display screen becomes too high, the icons of this category are blanked out and no longer displayed. Yet as the threshold map scale for blanking out icons cannot be set too low, overcrowding generally still occurs in urban areas.

On the other hand, in rural areas, smaller map scales are generally used for displaying map data. As on larger scales, the map sections shown on the display are too small to include any useful information. Accordingly, at the larger map scales at which the POI icons of a particular category are still displayed, no icons will be visible, as the displayed map section is too small. If the user zooms out the map, i.e. changes to smaller map scales, in order to enlarge the field of view, the icon category will be blanked out due to the smaller map scale (and assumed higher icon density). As an example, POIs of the category restaurants are already blanked out at map scales between 1:200,000 to 1:500,000. The user will thus have difficulties of finding a restaurant in a rural area, which is convenient to pass by.

For such rural areas having only a low density infrastructure, a navigation system may only offer the user to perform a POI search, which returns a list of POIs. The problem is that the user generally does not know where the particular POIs are located on the map, or in which direction the POIs are located. Accordingly, if a user travels on a particular route through a rural area, and the user would like to stop at a restaurant, such a POI search is generally not very helpful.

A system for displaying points of interest (POIs) on a display of a navigation system which is capable of displaying maps at different map scales is provided. The navigation system includes a database which stores point of interest (POI) data which includes POIs and their locations. The POI data also includes substitute POIs for map regions of different sizes which are provided for different map scales. A substitute POI is provided for a particular map region if the number of POIs in the map region exceeds a threshold number, the substitute POI representing the POIs in the map region. An example method of operating the system includes the steps of determining a map section to be displayed at a particular map scale on the display and of retrieving from the database POI data for the map section to be displayed. For a POI located within the map section, whether the POI or if available, a substitute POI representing the POI is retrieved from the database depends on the particular map scale. The map section and the retrieved POI data are concurrently displayed on the display of the navigation device. A substitute POI included in the retrieved POI data and located within the map section is displayed as a substitute for the POIs which it represents.

As either single POIs or substitute POIs can be retrieved for displaying depending on the map scale used for displaying the map section, an overcrowding of POI icons on the display can be avoided. In particular, for smaller map scales, the substitute POIs can be retrieved and displayed, so that even in rural areas, POI information can be provided on the map displayed to the user. On the other hand, at larger map scales, the single POIs are retrieved, so that the user can obtain detailed information from the display on the locations of the single POIs. As a substitute POI can represent any number of POIs, no overcrowding occurs at small map scales even in urban areas including a plurality of POIs in the displayed map section.

In one example system, if the locations of the POI data points (POIs and/or substitute POIs) stored in the database for a certain map region size have a distance that is below a predefined minimum distance, the POI data for the map regions of the next larger size is retrieved from the database and displayed. The minimum distance can depend on the map scale and can be chosen so that the size of the minimum distance as represented on the display is constant for the different map scales. In consequence, if more than a predetermined threshold number of POIs exists in an area on the display corresponding to the map region, the substitute POI for the map region is displayed, thereby avoiding overcrowding and the need to blank out POIs.

In another example system, the POI data is stored in the database in a tree structure in which POIs and substitute POIs are stored in nodes and in which a node for a substitute POI is linked to nodes of the POIs which it represents. In the tree structure, different depth levels may correspond to different sizes of the map regions of the substitute POIs stored in the nodes of the respective depth levels. The substitute POIs can be linked directly or indirectly, i.e. via further substitute POIs. The end nodes (or leaves) of the tree structure are generally POI nodes. A substitute POI node may only store the number of POIs it represents, the region size and a link to its child nodes, whereas a POI node may store all the data available for the POI in the system or a link to another database including such data.

Storing the POIs and substitute POIs in such a way has the advantage that for a particular map section, the database can, be searched with a small computational effort for retrieving the POI data suitable for the map scale. As different depth levels of the tree structure correspond to different map region sizes, the appropriate substitute POIs for a particular map scale can be easily identified.

In one example, the retrieving and the displaying of the POI data includes the steps of determining a root node of the tree structure for the map section to be displayed and performing a search for nodes linked to the determined root node, the search being stopped at a depth level of the tree structure at which the map locations of neighboring nodes have a distance smaller than a minimum distance which depends on the particular map scale. The minimum distance may be chosen so that it always corresponds to the same distance on the display of the navigation system. The method also includes retrieving the POIs included in the searched trees at all depth levels higher than the stopping depth level and retrieving the substitute POIs included in the searched trees at a depth level which is one level above the stopping depth level. The retrieved POIs and substitute POIs are then provided for being displayed as POI data. The search may for example be a breadth first search, yet other types of search methods may be used.

Accordingly, it can be assured that a minimum distance is kept on the display between two displayed POI data points, a POI data point being either a POI or a substitute POI. Further, even if only one POI exists in the displayed map section at a small map scale, the POI is retrieved and displayed, so that it can easily be found by the user of the navigation device (i.e. it is not blanked out). The minimum distance that two POI data points should keep on the display of the navigation device can depend on the display size and/or the display resolution. It may for example be between 0.5 and 4 cm.

Preferably, the search only considers nodes of POIs that are located in the map section to be displayed, and nodes of substitute POIs that have an associated map region which is at least partially located within the map section to be displayed. The search can thus be accelerated.

Generally, only the POIs and substitute POIs located within the map section are displayed. If a substitute POI is retrieved, but located outside the map section, the substitute POI may be displayed at the periphery of the display or may be ignored.

At the highest level of the tree structure, which may correspond to the smallest map scale available for displaying, a root node can be provided which includes a substitute POI which is associated with a region that encompasses all POIs of the database. If a map region at the highest level includes only a single POI, it can be directly stored in the root node. POIs and substitute POIs can thus easily be retrieved and displayed even at a smallest map scale. As an example, for a map of Europe, the root node may store a substitute POI associated with a map region that encompasses Europe, and thus all POIs located therein.

Furthermore, for map regions of a smallest predetermined size corresponding to a largest map scale, the POIs are stored as separate POIs in the database irrespective of the number of POIs located within one of the smallest regions. In other words, the tree structure may have a lowest level, which only includes nodes that directly store POIs, irrespective of the distances between them. It may thus be avoided that substitute POIs are still displayed at the largest map scale of the navigation system for a map section having a high density infrastructure. The user can thus be enabled to identify the single POIs on the display at the largest map scale.

In operation, the method may for example include the steps of determining if the particular map scale at which the map section is to be displayed is equal or larger than a predetermined largest map scale and in the affirmative, retrieving all the POIs from the database located within the map section as POI data which is to be displayed. All POIs available for the map section may thus be displayed at the largest map scale. In other examples, at the largest map scale available for displaying, substitute POIs may still be displayed, so as to avoid overcrowding.

The method may also include the steps of making a substitute POI which is displayed on the display user selectable and, upon selection of the substitute POI by means of a user input, providing a selection list to the user including the POIs which the selected substitute POI represents. A POI selected from the list may then be displayed on the display. Selection may for example be performed at the second largest map scale of the navigation system. It is particularly beneficial if the displaying of all POIs at the largest map scale is disabled to avoid overcrowding, as all POIs are then still selectable by means of the selection list. Overcrowding can thus be avoided while still enabling access to each individual POI.

The methods described above with respect to POIs in general are preferably performed per POI category. In particular, the POI data in the database can be provided for different POI categories, where the POI data for a particular category includes a substitute POI of the category for a map region if the number of POIs of the same category in the map region exceeds the threshold number. Even at smaller map scales, at which only substitute POIs may be displayed, the user is thus enabled to easily differentiate between different types of POIs. Each of the features mentioned above can thus be performed per POI category; the tree structure for storing the POI data can for example be provided for each POI category. The database may thus include a root node for each POI category.

The method may also include the step of determining one or more categories for which POIs are to be displayed, where the step of displaying the POI data is configured such that at an overview map scale, the POI data for all the determined categories is displayed. The determination of the categories may occur automatically, e.g. in dependence on the displayed map content, or by user input, e.g. by the user selecting the individual categories or a category profile, yet the categories to be displayed may also be predefined in the system. It can thus be ensured that only the POIs relevant to the user are displayed and that an overcrowding of the display by too many different POI categories is avoided, e.g. by defining a maximum number of allowed categories.

Preferably, the displaying occurs such that at an overview map scale, the POI data for at least one of the categories "restaurants" and "gas stations" is displayed, if the respective category is selected to be displayed. Accordingly, even at the relatively small overview map scale, at which POIs for gas stations and restaurants may generally be blanked out, the POI data for one or both categories is still displayed. Locating these POIs on the map is thus facilitated.

The overview map scale may be smaller than about 1:500,000, preferably smaller than about 1:1,000,000, or even smaller than about 1:2,000,000. As an example, the overview map scale may be 1:2,000,000.

In one example, the size of the map regions is chosen such that the map regions have the same size on the display of the navigation device at the map scale for which the respective map region is provided. The size of the map regions may for example scale inversely proportional with the associated map scales. The map region size as measured on the display at the corresponding map scale may for example be in between 0.5×0.5 cm and 4×4 cm. Note that the map regions may have different rectangular shapes.

The size of map regions at higher depth levels may be larger than at lower depth levels of the tree structure. Further, the variation of sizes of map regions within a depth level of the tree structure may be smaller than the variation of sizes of map regions between different depth levels. In particular, the map regions at a depth level may have different sizes and may even overlap.

In the tree structure, the map region associated with a substitute POI stored in a particular node may be partially or completely included in the map region associated with a substitute POI stored in the parent node of the particular node.

In one example, the threshold number for the number of POIs in a map region equals 1. Accordingly, a substitute POI may already be provided if more than one POI (i.e. two or more POIs) is located within a map region. By choosing such a small threshold, overcrowding can efficiently be avoided.

The substitute POI may be displayed as a graphical symbol, such as a character, an icon, a pictogram or a combination of these, which is indicative of the number of POIs which the substitute POI represents. This number may be retrieved from the database when retrieving the substitute POI. As an example, a suitable indicator may be the height of a stack of icons or a number displayed within or adjacent to the icon. The nodes of the tree structure for POIs and substitute POIs may store a pointer to the respective graphical symbol which may thus be stored at a different location.

The location of a substitute POI may be determined by the locations of the POIs which it represents. The location of the substitute POI may for example be a mean value or preferably a weighted mean value of the locations of the POIs which it represents. The location of the substitute POI can again be stored in the respective node of the tree structure.

In another example, a navigation system including a display for displaying map sections and POI data to a user and a database which stores POI data is provided. The POI data includes POIs and their locations and substitute POIs for map regions of different sizes which are provided for different map scales, a substitute POI being provided for a particular map region if the number of POIs in the map region exceeds a threshold number, with the substitute POI representing the POIs in the map region.

The navigation system also includes a map section determination unit adapted to determine a map section to be displayed at a particular map scale and a retrieval unit adapted to retrieve from the database POI data for the map section to be displayed, where it depends on the map scale whether for a POI located in the map section, the POI or, if available, a substitute POI representing the POI is retrieved from the database for displaying. A display control unit of the navigation system is adapted to concurrently display the map section and the retrieved POI data, where a substitute POI included in the retrieved POI data and located within the map section is displayed as a substitute for the POI which it represents. With such a navigation system advantages similar to the ones outlined above with respect to the method may be achieved.

In one example, the navigation system is configured so as to perform any of the methods mentioned above. In particular, the database of the navigation system may store the POI data in the tree structure as described above. The POI data may be provided in the database for different POI categories, and accordingly the navigation system may process the POI data per category as described above.

In another example, a computer program product can be loaded into the internal memory of a computing device. The product includes software code portions for performing any of the methods mentioned above when the product is executed. The computer program product can be provided as a computer program stored on an electronically readable data carrier. The electronically readable data carrier can include stored electronically readable control information configured such that when using the data carrier in a computing device, the control information performs any of the methods mentioned above.

In yet another example, an electronically readable data carrier can include a POI database stored on the data carrier. The POI database includes POIs of different categories and their locations. The database also includes substitute POIs for map regions of different sizes which are provided for different map scales, a substitute POI of a category being provided for a particular map region if the number of POIs of the same category in the map region exceeds a threshold number. The POI database may be configured as described above with respect to any of the aspects and examples of the invention.

It should be understood that the features mentioned above and those yet to be explained below can be used not only in the respective combinations indicated, but also in other combinations or in isolation, without leaving the scope of the present invention.

FIG. 1 shows a schematic drawing of an example navigation system 100. Navigation system 100 may be implemented in a variety of ways, for example as a vehicle-mounted navigation system, a hand-held personal navigation device (PND), a navigation system implemented in a hand-held communication device, such as a smart phone, or in a personal digital assistant (PDA), or the like.

Navigation system 100 is provided with a plurality of modules, units, and/or components. Navigation system 100 may be a computing device or computer, including for example software, hardware, or a combination of hardware and software capable of performing the described functionality. Navigation system 100 may be one or more separate systems or devices, may be one or more systems or devices included in another system, or may be combined with other systems or devices within the other system. In other examples, fewer or additional blocks may be used to illustrate the functionality of navigation system 100. The modules, units and/or components of navigation system 100 may include a memory 102, a map database 103, a POI database 104, a processing unit 105, a map unit 106, a retrieval unit 107, a display control unit 108, and a display 101.

The functionality included in navigation system 100 may be modules, components and/or units. The term "module" or "component" or "unit" may be defined to include one or more executable parts of a system. As described herein, the modules and/or units are defined to include software, hardware, or some combination thereof executable by a processor (described later). Software included in the modules and/or units may include instructions stored in memory or a computer readable medium that are executable by the processor, or any other processor. Hardware, included in the modules and/or units may include various devices, components, circuits, gates, circuit boards, and the like that are executable, directed, and/or controlled for performance by the processor.

Navigation system 100 is controlled by processing unit 105 which may operate according to control instructions stored in memory 102. Processing unit 105 can be implemented as a single or as multiple microprocessors, as a digital signal processor (DSP), an application-specific integrated circuit (ASIC) or the like. Memory 102 may include all types of memory, such as random access memory, flash memory, a hard drive, a CD-ROM device, a DVD device, a ROM memory device, or any other non-transitory data storage device. In addition, rewritable non-volatile memory, such as flash memory, may be provided to store processing information in a flexible way and to maintain the stored information even in the case of a power outage.

Processing unit 105 is adapted to retrieve map data from a map database 103 stored in memory 102. Map database 103 may be a functional unit configured to store map data. Map data may be generated and/or provided by map database 103. Map data also may be retrieved by retrieval unit 107. Processing unit 105 includes the map unit 106 which may be a functional unit configured to determine a map section to be displayed based on a particular map scale. Processing unit 105 further includes the retrieval unit 107 which may be a functional unit configured to retrieve, for example, POI data for the determined map section from the POI database 104 stored in memory 102. POI database 104 may be a functional unit configured to store POI data. POI data may be generated and/or provided by POI database 104. POI data also may be retrieved by retrieval unit 107. Depending on the particular map scale with which the determined map section is to be displayed, the retrieval unit 107 may retrieve from POI database 104 either points of interest (POIs) or substitute POIs for being displayed. The retrieval unit 107 also may retrieve the locations of the POIs and substitute POIs and/or further information provided for the POIs in POI database 104. For purposes other than displaying, retrieval unit 107 may retrieve any POI data from database 104 independent of map scale, e.g. for buffering the data in another type of memory or the like.

Processing unit 105 further includes the display control unit 108 which may be a functional unit configured to render an image to be displayed based on the determined map section and the retrieved POI data. The rendered image includes graphical symbols representative of the POIs and substitute POIs located within the map section, the symbols being positioned in the image at the respective locations of the POI data points (POIs or substitute POIs) on the map. The graphical symbols can be stored in memory 102 and can be retrieved by processing unit 105, e.g. by retrieval unit 107 or display control unit 108. Display control unit 108 may be configured to render the image on the display. Display control unit 108 also may be configured to generate and/or transmit display data to be received for display. The display data may include the rendered image or portions or components of the rendered image. The display data may be based on the determined map section and the retrieved POI data and may include, for example, graphical symbols representative of the POIs and substitute POIs located within the map section.

The rendered image may be given out on display 101. Display 101 may be a full graphic display, such as, for example, a liquid-crystal display, a thin-film transistor display, or a cathode-ray tube display. The optical display device 144 also may be a projection display, such as a head-up display in which optical information is projected onto a windscreen of the vehicle. Display 101 also may be combined with an input device. For example, display 101 may be configured as a touchscreen device. Display 101 may be a dedicated component of the navigation system or may be used together with other systems, such as, for example, a multi-media system.

Functional units 106, 107 and 108 can implemented as software code portions running on the processing unit 105. Yet they may also be implemented as separate physical units or as software code portions running on different physically separate processing units.

It is to be understood that any direct connection or coupling between the components, units or functional blocks shown in FIG. 1 can also be implemented by an indirect connection or coupling, i.e. a connection or coupling with one or more additional intervening elements. Furthermore, the partitioning into components, units or functional blocks shown in FIG. 1 is not to be construed as indicating that these units necessarily are implemented as physically separate units, but the components, units or functional blocks may also be implemented as separate units, circuits, chips or circuit elements, or may as well be implemented in a common circuit, chip, circuit element or unit. As an example, display control unit 108 may be implemented as a separate graphics processor interfacing processing unit 105 and display 101. Memory 102 may include memory local to navigation system 100 and memory that is accessible via a network or another type of connection. As an example, POI database 104 may be stored on a remote server accessible by a navigation system over a wired or wireless network connection.

Navigation system 100 may also include further components common to navigation systems. For example, navigation system 100 may include a position detection unit, e.g. a GPS receiver, configured to detect a position and/or provide position data. Navigation system 100 also may include a user interface and/or user input device configured to present information to a user and/or to receive input from a user. The user input device may include suitably designed switches, a touchscreen device, and/or a keyboard to enable, for example, user selection of a POI displayed by the navigation system.

A navigation system may be capable of displaying a map at different map scales, e.g. by providing different zoom levels. A navigation system also may be capable of displaying POIs for a plurality of categories together with the map data. For each POI category a density of the POIs on the map may be assumed, e.g. based on an average density of these POIs in an urban area. At a certain map scale at which the density of the POIs of a certain category as displayed on the display becomes too high, the icons for these POIs are no longer shown, i.e. the POIs of the particular category are blanked out. Restaurants are for example blanked out at a map scale of about 1:200,000. As the blanking out of the POI category is bound to a certain map scale, overcrowding can still occur in areas having a very high density infrastructure, while in rural areas, the smallest map scale at which POIs are still displayed is generally too large so that the correspondingly small displayed map section does not include any POIs (due to their low density in rural areas). When zooming out in such a situation, the map scale becomes smaller, which besides resulting in a larger map section being displayed also leads to the blanking out of the POIs. Finding POIs in rural areas is thus rather difficult in conventional systems.

To avoid these problems, the threshold map scale down to which POIs of a particular category are displayed is set to an overview map scale in the navigation system 100. The overview map scale is a map scale at which navigation system 100 provides an overview over a larger map area. The overview map scale may generally depend on the map data and POI data used by the navigation system. For the map of a country and a corresponding POI database, the whole country may be shown at the overview map scale. The overview map scale may be smaller than 1:500,000, or even smaller than 1:1,000,000, e.g. 1:2,000,000. The same threshold map scale is preferably set for all POI categories. As the POIs are in consequence still visible at the overview map scale, POIs can be found even in areas having a very low density infrastructure. As an example, the threshold map scale may be the smallest available map scale so that no blanking out of POIs occurs at all.

Navigation system 100 is further configured to avoid overcrowding of POIs on the displayed map section. Overcrowding occurs if too many POIs of the categories to be displayed are available for the displayed map section, so that the graphical symbols or icons for the POIs overlap, which results in a lack, of clarity and in an obscuring of the map information. To avoid overcrowding, navigation system 100 stores in POI database 104 not only POIs, but also substitute POIs, each of which represents a group of POIs (two or more). The substitute POIs are provided for different map scales, as the density of POIs in the map section as displayed changes with map scale. The substitute POI can be marked as such when being displayed, e.g. by using a particular icon, and can further include an indication of the number of POIs it represents.

Depending on the map scale with which the map section is to be displayed on display 101, and on further parameters such as a defined minimum distance of POIs as measured on display 101 (which may itself depend on the display's size and/or resolution) and on the number and locations of POIs located within the map section to be displayed, retrieval unit 107 may either retrieve POIs or substitute POIs from the POI database 104. The retrieving may be performed so that the minimum distance between the POI data points (POIs or substitute POIs) as measured on the display is kept. For example, navigation system 100 may determine the distance between the POI data points as a search through the database is conducted as further described below. The minimum distance of POI data points on the display may for example be between 0.5 and 4 cm, e.g. about 3 cm, or any other minimum distance suitable for the particular display and the graphical representation used for displaying the POI data points. It thus may be ensured that the minimum distance between displayed POI data points is kept, so that by making use of the substitute POIs, overcrowding can efficiently be avoided even if a map section including high density infrastructure is displayed at a small map scale.

A substitute POI generally only represents POIs of the same POI category, so that the selective displaying of POI categories remains enabled and a comprehensive presentation of information is achieved.

Figure 5:
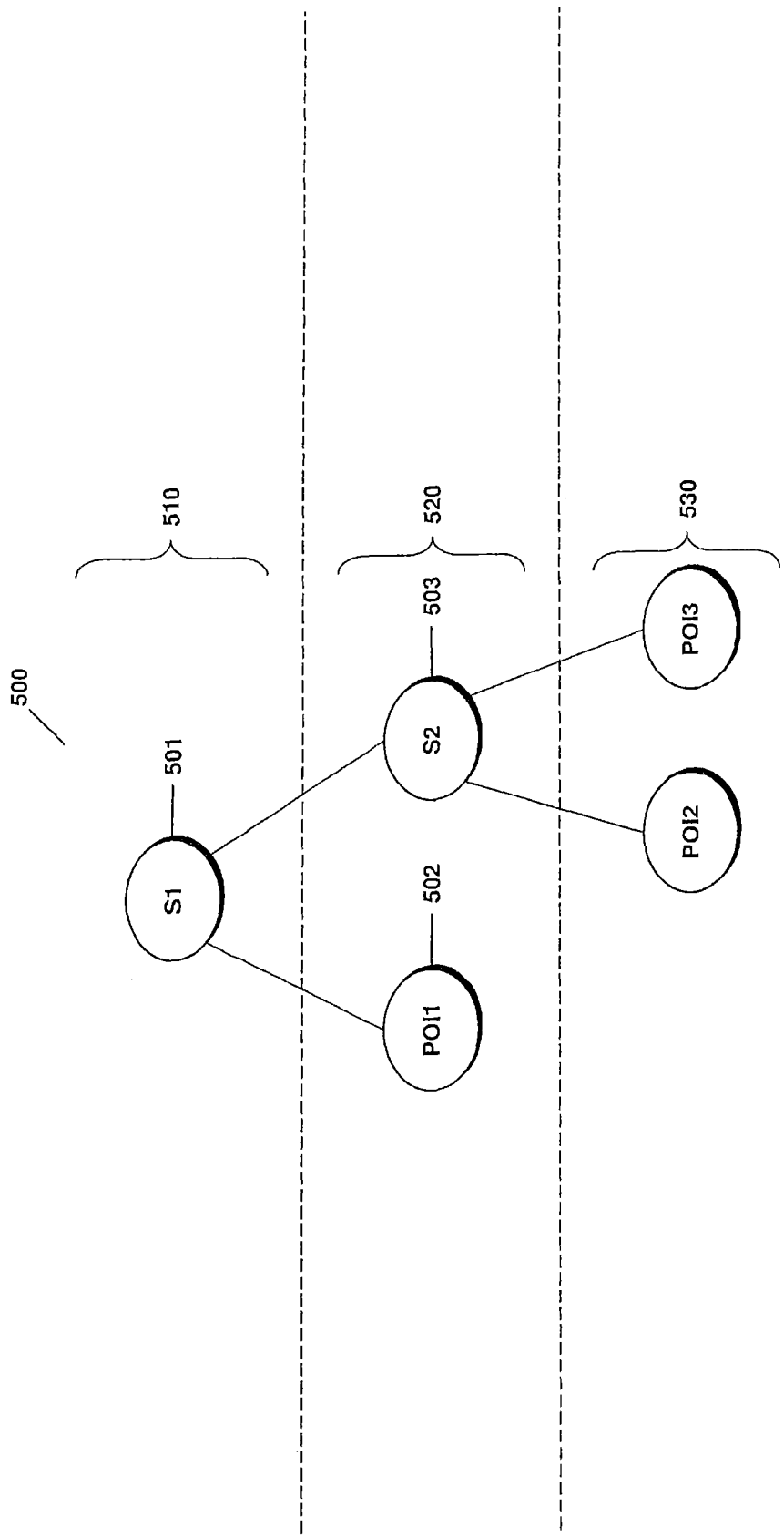
FIG. 5 is a schematic drawing illustrating an example of a tree structure of a POI database.

POIs and substitute POIs are stored in the nodes of a tree structure in POI database 104 as illustrated in FIG. 5 so as to enable a fast and efficient access. A tree structure may be provided per POI category. In one example, the tree structure includes different depth levels 510, 520 and 530, which essentially correspond to different map scales. At different depth levels of the tree structure, the substitute POIs are associated with different sized map regions. This effectively provides substitute POIs for different map scales of the navigation system. As an example, for a smaller map scale, substitute POIs of a higher depth level which represent the POIs of a larger map region are displayed, while at a larger map scale, the substitute POIs of a lower depth level are displayed. The different depth levels are thus provided to enable a comprehensive display at different map scales, although the depth levels are actually independent on the map scales available for displaying in the system.

For each POI category, the POI database 104 includes a root node, which in the example of FIG. 5 is the node 501 storing the substitute POI S1. The substitute POI stored in the root node can for example be displayed at the smallest map scale. The smallest map scale may be an overview map scale at which a whole country or region for which map database 103 is provided is displayed. It may also be a larger map scale, e.g. of 1:2,000,000, at which 1 cm on the display corresponds to 20 kilometres on the map (i.e. in the real world).

Each POI node stores the available POI data, e.g. POI location (longitude and latitude position), and optionally POI name, POI description and the like. It is also possible to store only the POI location and a link into another database including further information on the POI. The substitute POI nodes each may store a map region, with the corresponding substitute POI representing the POIs located in the map region. The substitute POI nodes also may store identifiers identifying and/or linked to the map regions. The map region may for example be modeled as a rectangular area on the map in which the positions of the POIs of respective child nodes are located. For different depth levels of the tree structure, different sized map regions may be provided, for example, with deeper levels corresponding to smaller map regions (i.e. for the substitute POIs, child nodes may be associated with smaller regions than parent nodes). The map region associated with the root node may be a minimum bounding rectangle (MBR) which is spanned over all the POIs of the particular category located in database 104. It may for example represent tens or hundreds of thousands of POIs. At the next lower depth level, the map regions associated with the substitute POIs may again be MBRs of a smaller size each spanned over a particular fraction of the POIs. Accordingly, the map regions of a depth level can have different sizes, can overlap and do not need to cover the whole map region of the parent node. The map regions do thus not need to correspond to a particular pattern or grid or to a particular map scale.

As an example, at the highest depth a level 510 including the root node 501, the region size may be 40×40 km, corresponding to 2×2 cm on the display at the overview map scale (e.g. for a map of a particular geographical area). The map region associated with the root node is chosen such that it covers all the POIs located within this geographical area. As more than a threshold number of POIs is located in the map region, a substitute POI is stored in the root node of the tree structure in association with the map region. Navigation system 100 may determine that a substitute POI should be stored (i.e., that more than a threshold number of POIs is located in the map region) upon generating the database. The POI data also may be provided in the tree structure with a substitute POI being stored to represent POIs located within the map region. The threshold number can equal 1 (i.e. two or more POIs located in the region lead to the storing of a substitute POI), yet other threshold numbers, such as 2, 3, 4, or 5 may also be chosen.

An image 410 that may be displayed at the overview map scale (e.g. 1:2,000,000) is schematically illustrated in FIG. 4B. Zooming in onto the gray shaded region is illustrated in the further images 420 and 430. In FIG. 4A, the gray shaded area is displayed enlarged to always the same scale to better illustrate the different sized map regions associated with a substitute POI. The map region 411 (indicated by dashed lines) includes POI1, POI2 and POI3, (reference symbols 423, 431 and 432) and thus more than one POI, so that the substitute POI S1 is stored in the tree structure in root node 501 in association with the region 411. When displaying the map at the overview map scale, S1 is retrieved from the POI database and displayed as substitute POI 412 on the map using a graphical symbol indicating the number of represented POIs, as illustrated in image 410.

At the next lower depth level 520 of the tree structure, the map region may for example have a size of 20×20 km (as measured on the map) corresponding again to 2×2 cm on the display at a map scale of 1:1,000,000. Region 411 is for example subdivided into four regions having a quarter of the size for the next lower depth level 520, or MBRs are spanned each over a fraction of the POIs to form the map regions. At this depth level, POI1 (reference symbol 423) is located within one of the regions and POI2 and POI3 (reference symbols 431 and 432) are located in another region 422. Accordingly, POI1 is directly stored in node 502 of the tree 500, whereas a substitute POI S2 is stored in node 503 in association with the other region 422 including POI2 and POI3. Accordingly, the image 420 of FIG. 4B rendered at the lower scale of 1:1,000,000 includes the POI1 (reference sign 423) and in the map region 422 the substitute POI S2 (reference sign 424), which represents POI2 and POI3, the POI data points being retrieved for the respective map scale from POI database 104.

At the lowest depth level 530 of tree 500 shown in FIG. 5, the map regions are small enough so that each POI is located in a different map region. Tree 500 thus includes nodes for POI2 and POI3, but no substitute POIs at the lowest depth level 530. This can also be seen from the rendered image 430 (map scale 1:500,000) in FIG. 4B, which now shows only single POIs 423 (POI1), 431 (POI2), and 432 (POI3), but not substitute POIs.

If at the highest depth level 510 only a single POI is located within the corresponding map region, the root node can directly store the POI. The nodes of the substitute POIs are linked to the nodes of the POIs which they represent, either directly or indirectly via other substitute POI nodes (e.g. node 503). Generally, all leaves of tree 500 store POIs. It should be clear that the tree structure may include more depth levels than shown in FIG. 5, e.g. depending on the range of map scales over which the POI data is to be displayed. Preferably, the tree structure is configured to include a deepest level in which only POI nodes are stored. The deepest level may thus not be associated with any region size, or the region size may be ignored or set to a very small value.

Further, it should be clear that the region sizes associated with the substitute POI nodes in the tree structure are independent of the map scales at which a map section can be displayed on display 101. The tree structure may, but does not need to include a depth level for every map scale available. The retrieval of POI data for any display map scale irrespective of the map region sizes provided at the different depth levels of the tree structure 500 is described below with respect to FIGS. 2 and 3.

Figure 4:
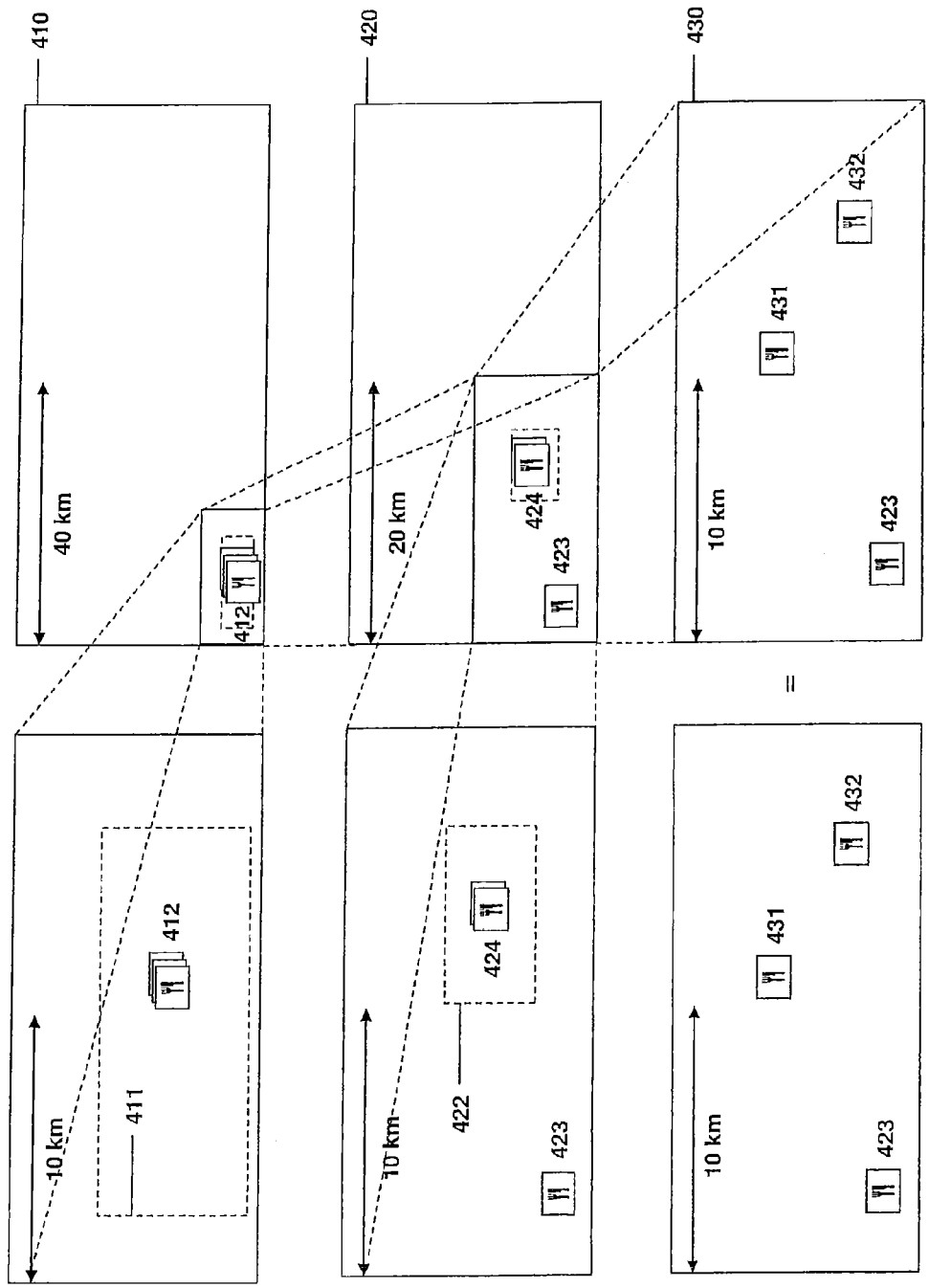
FIGS. 4A and 4B are schematic drawings illustrating an example of displaying POIs and substitute POIs at different map scales.

The location of a substitute POI which is stored in the respective node can be determined based on the locations of the POIs represented by the substitute POI. For example, the location of a substitute POI may be calculated by calculating a mean position of the POIs which it represents. The mean position may include a mean latitude calculated by determining the mean of the latitudes of the individual POIs represented by the substitute POI. The mean position also may include a mean longitude calculated by determining the mean of the longitudes of the individual POIs represented by the substitute POI. In other examples, a weighted mean may be calculated so as to adjust the influence of a particular POI on the mean location. For example, the latitude and/or longitude of the particular POI may be multiplied by a weighting factor and the weighted latitude and/or longitude used to calculate the mean position as described above. The weighting factor may be any number such as, for example, 0, 1.5, 2, or any other number. When rendering a map image, a graphical symbol may be included at the determined location of the substitute POI on the map. As illustrated in FIG. 4, the symbol can be a stack of icons of the particular POI category, with the stack height indicating the number of represented POIs. Additionally or alternatively, the graphical symbol may also include a numerical indication of the number of represented POIs, such as a number displayed within or adjacent to the graphical symbol for the substitute POI. The graphical symbol also may include any other type of icon. Generally, the symbol indicates the POI category, in FIG. 4 the category "restaurants".

By referring to FIG. 4B one example of the operation of navigation system 100 can be summarized as follows: Even at the smallest map scales (rendered image 410), all POIs of the selected categories are indicated. No overcrowding occurs even in densely populated areas, as a substitute POI is displayed if more than the threshold number of POIs are located in the associated map region. On the overview map scale the user is capable of observing all POIs of the selected category in the surroundings, and can thus easily determine whether it is convenient to pass a particular POI or not, e.g. if the POI is located on or adjacent to his current route. When, zooming in on a particular map area (as illustrated with the sequence of images 410, 420 and 430), the positions of the single POIs on the map are resolved.

Examples of the operations that may be performed by the navigation system 100 of FIG. 1 are described below with respect to FIGS. 2 and 3. In step 210 of the method according to FIG. 2 the POI categories to be displayed are determined. This can occur by the user selecting particular categories, such as restaurants, gas stations, pharmacies or the like, e.g. by means of a user interface (not shown in FIG. 1) or by the navigation system automatically determining the categories. Categories to be displayed may be predefined by navigation system 100, which may for example display interesting sights and gas stations when performing a route guidance.

In step 220, the user selects a zoom level which corresponds to a particular map scale. The navigation system may for example display the map at a rather large scale during route guidance to provide detailed map information. The user can actuate a control element in order to zoom out so as to observe a larger map section at a smaller map scale. For the new map scale, the map section to be displayed is determined in step 230. The map section to be displayed may be determined by map unit 106 based on the map scale. The corresponding map data can then be retrieved by map unit 106 or retrieval unit 107 from map database 103.

The navigation system can be configured with a predefined minimum POI distance as measured on the display which should be kept in order to produce a clear and comprehensive image. Navigation system 100 may determine the predefined minimum POI distance based on factors such as the size of the display, the resolution of the display, and the size of the icons to be displayed. The predefined distance may be determined by, for example, map unit 106 or display control unit 108. The user also may set the predefined minimum POI distance. From the predefined minimum POI distance and the new map scale, a required minimum distance for POI data points as measured on the map (i.e. in the real world) is determined in step 240. The required minimum distance may be determined by processor 105 (e.g., map unit 106, retrieval unit 107, or display control unit 108). The navigation system may only allow neighboring POI data points to be displayed if they keep the minimum map distance. As an example, if the new map scale is 1:2,000,000 and the required minimum distance on the display is 3 centimetres, then POI data points have to keep a minimum distance of 60 kilometres on the map. In step 250, the POI data base 104 is accessed for retrieving POI data for the selected POI categories.

Figure 3:
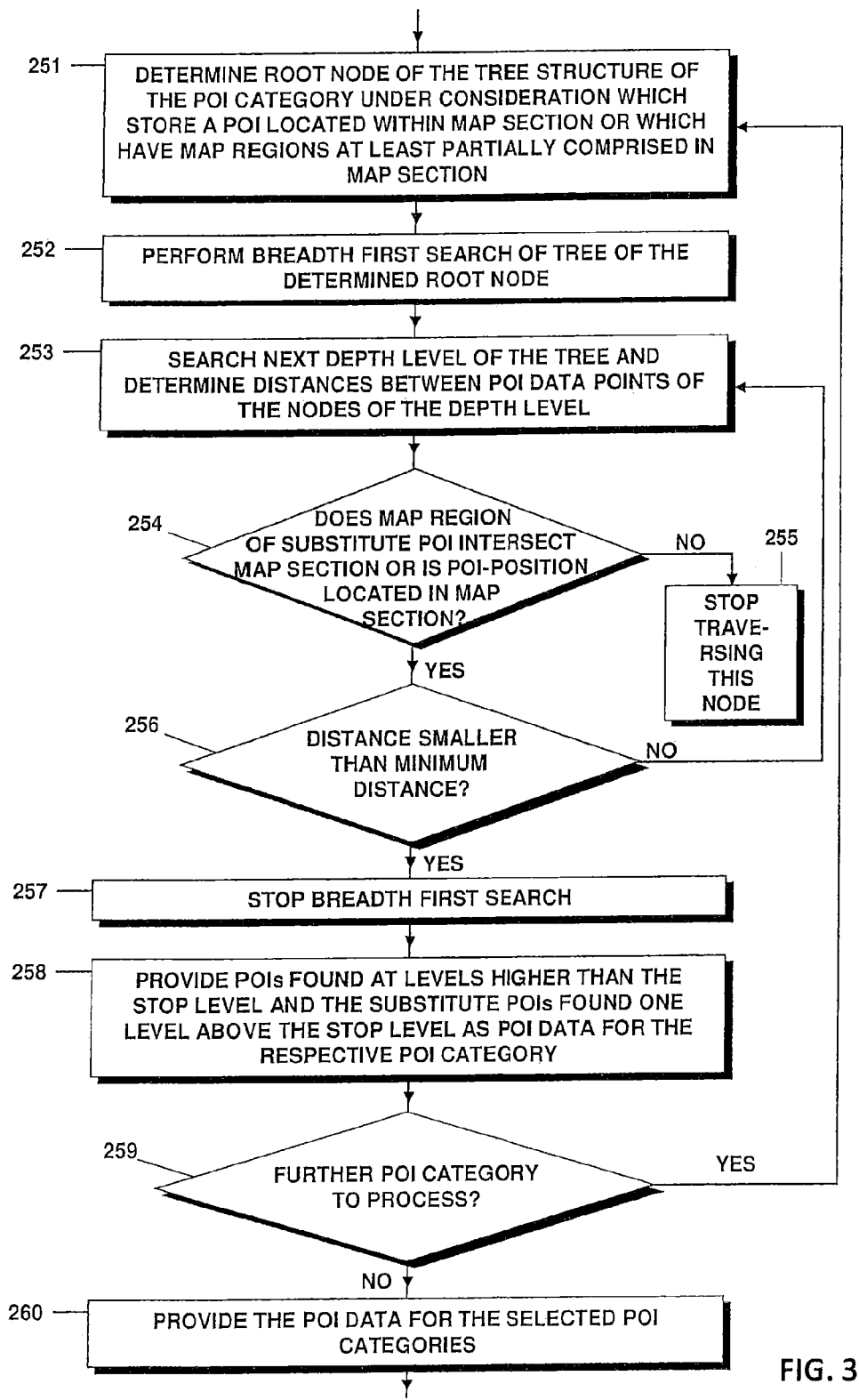
FIG. 3 shows a flow diagram illustrating an example of a method for retrieving POI data from a POI database.

A possible implementation of step 250 is illustrated in the flow diagram of FIG. 3. The database includes a tree structure for each category which stores the POIs and substitute POIs as described in detail above with respect to FIG. 5. The processing occurs per category and may be performed by processing unit 105. In step 251, the root node of the tree structure of the POI category which is being processed is determined. The POI database for a particular geographical area generally includes one root node storing a substitute POI for the associated map area which spans all POIs of the same category included in the database. The map area associated with the root node is thus in general at least partially included in the map section to be displayed. The root node is a good starting point for searching the tree structure. The tree of the determined root node is searched using a breadth first search in step 252. A first step of the breadth first search may include searching all neighboring nodes of the root node (or any other node at which the search is started). Once all neighboring nodes of the root node have been searched, a second step of the breadth first search may include searching any previously unsearched neighboring nodes of the neighboring nodes searched during the first step. The breadth first search may continue in a similar manner until the end of the search is reached as described below. Root nodes which directly store a POI and which accordingly do not have any child nodes do of course not need to be searched.

The search may be performed until at a certain depth level, the required minimum distance between POI data points is no longer kept. The distance between POI data points may be calculated by, for example, processing unit 105 (e.g., map unit 106, retrieval unit 107, or display control unit 108) at each step of the search. In the above example, this would be the case if two POI data points (POIs or substitute POIs) of the same depth level have a distance of smaller than 60 kilometers. The breadth first search first considers all child nodes of the root node (depth level 520 in FIG. 5), then the grandchild nodes (depth level 530 in FIG. 5) and so on.

The distances between the POI data points of the nodes of the currently searched depth level are determined in step 253. When searching depth level 520, this would be the distance between POI1 and substitute POI S2.

Furthermore, when searching a depth level, it is checked for each POI whether it is located within the map section to be displayed, and for each substitute POI whether its associated map region intersects the map section to be displayed (decision step 254). If the result of the check is negative, then the traversing of the node under consideration is stopped (step 255), i.e. distances of this node to other nodes do not need to be determined, and child nodes of this node are not considered when searching the next depth level. Otherwise, the method continues. The search can thus be restricted to the relevant nodes of the tree which accelerates the search. For example, retrieval unit 107 may be configured to retrieve POI data from nodes of the tree structure corresponding to map regions that overlap the map section to be displayed or that are otherwise associated with POIs located within the map section to be displayed. In this manner, the number of nodes that may need to be searched may be reduced (i.e., it may be unnecessary to search the entire data tree structure).

If for a node, the distance to another node is smaller than the minimum distance (decision step 256), then the breadth first search is stopped (step 257). Otherwise, the next depth level is searched.

After the search has been stopped, the POIs found at all the levels higher than the stop level and the substitute POIs found one level above the stop level are provided as POI data for the respective POI category (step 258). If the search is stopped at level 520 in the example of FIG. 5, substitute POI S1 is retrieved, while when stopping at depth level 530, POI1 and substitute POI S2 are retrieved by, for example retrieval unit 107. It is thus clear that while the region sizes chosen for the substitute POIs determine the "depth resolution" of the tree structure, they are entirely independent of the map scale at which the map section is to be displayed. For example, the number of depth levels provided in the tree structure may be increased to reduce the difference between the size of the map regions associated with one depth level and the size of the map regions associated with an adjacent depth level (e.g., by dividing the POI data for a given map into a greater number of depth levels and/or a greater number of map regions) and thus to increase the depth resolution. The number of depth levels and/or the size of the map regions associated with respective depth levels may be independent of the various map scales that may be provided for navigation system 100. The display map scale is used for determining the minimum distance between POI data points and thus also determines at which depth level the search is stopped and whether a POI or a substitute POI is retrieved.

In decision step 259 it is checked if a further POI category is to be processed. If there is a further category, the method returns to step 251; otherwise, the POI data retrieved for the selected POI categories is provided for further processing in step 260.

Figure 2:
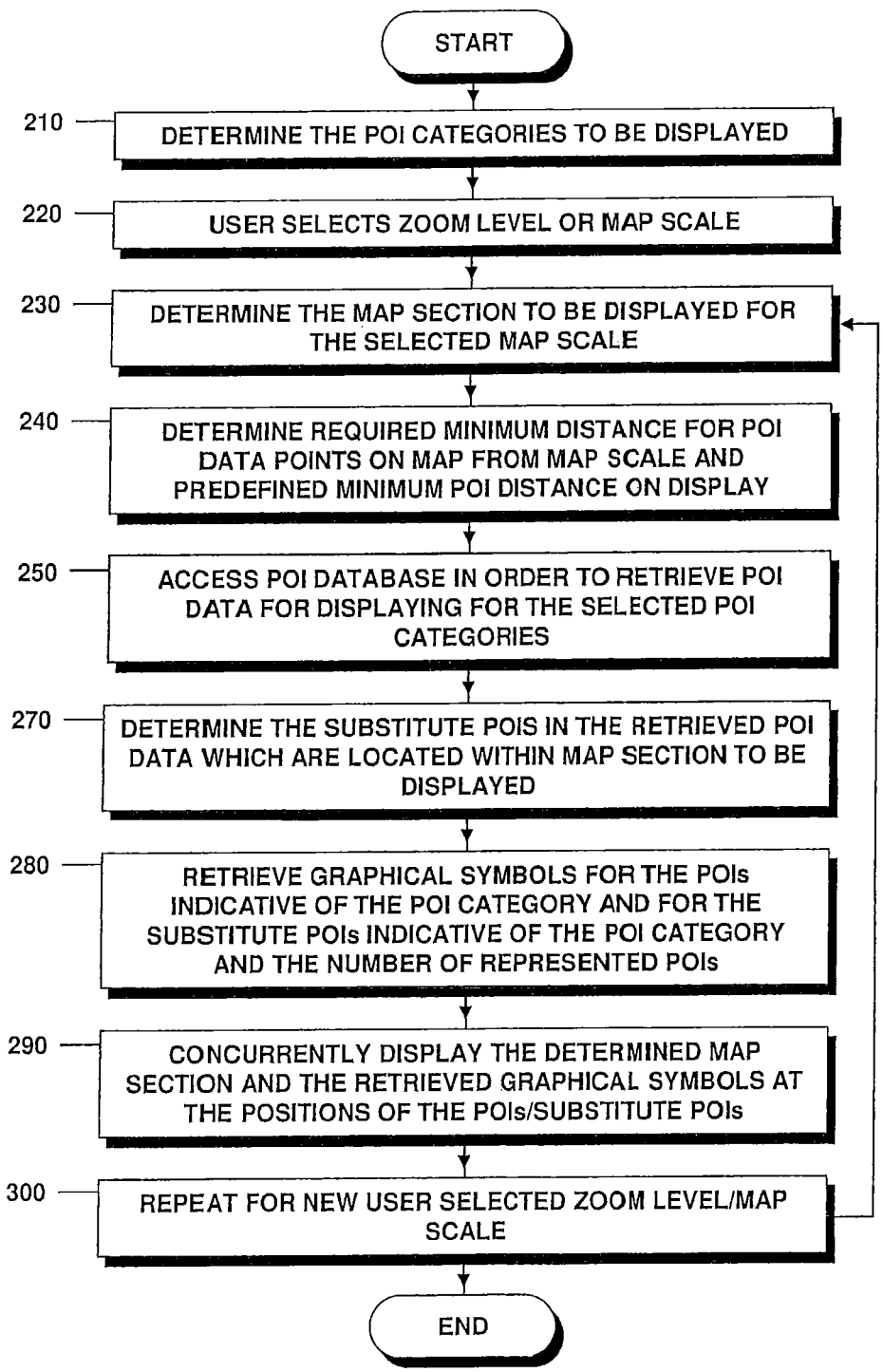
FIG. 2 shows a flow diagram illustrating an example of a method for displaying points of interest.

Other implementations of step 250 of FIG. 2 are certainly conceivable, such as using a different type of search algorithm for searching the POI database, directly correlating a depth level of the tree structure with a particular display map scale, or the like.

In some instances, a substitute node may be linked to POIs some of which are located within the map section to be displayed and some of which are located outside the map section. While retrieved POIs are generally located within the map section (due to decision step 254), retrieved substitute POIs can be located inside or outside the map section. Accordingly, in step 270 substitute POIs in the retrieved POI data which are located within the map section to be displayed are determined. This determination may be made by map unit 106, retrieval unit 107, and/or display control unit 108. Substitute POIs located outside the map section may either be disregarded or may be displayed at the periphery of the map section, as they may still link to POIs located within the map section.

For the so determined POIs and substitute POIs graphical symbols are retrieved in step 280. Graphical symbols may be retrieved by map unit 106, retrieval unit 107, and/or display control unit 108. As mentioned above, the graphical symbol for a substitute POI can be indicative of the POI category and/or the number of represented POIs, as illustrated in FIG. 4. Steps 250-280 may for example be performed by retrieval unit 107.

The display control unit 108 can now render an image in which the graphical symbols of the POIs and substitute POIs retrieved for displaying are positioned at their respective map locations. The determined map section and the retrieved POIs and substitute POIs are then concurrently displayed in step 290. Accordingly, at smaller map scales, POI categories are not blanked out, but substitute POIs are displayed instead.

In step 300 the method is repeated if the user selects a new zoom level, i.e. zooms the map in or out. The POI retrieval and display procedure can certainly also be repeated if the map is panned by the user to a new map section.

The method and the navigation system can be configured to have a largest map scale which can be displayed. In one example all POIs of the selected categories are displayed at that largest map scale. While this enables the user to differentiate between the different individual POIs, overcrowding may occur in high density infrastructure areas. In another example, substitute POIs are also displayed at the largest map scale, if applicable (i.e. corresponding to the second lowest depth level in the tree structure). In order to enable the user to locate a particular POI, the substitute POIs can be made selectable. If the user selects a substitute POI by means of user input, e.g. using a pointer on the displayed map section, then all the POIs represented by the selected substitute POI can be presented to the user in a selection list (i.e. the POIs of the child nodes of the corresponding substitute POI node). On the selection list, the user can select a POI which can then be entered as a destination in a routing function or which can be is displayed on the map section. Any means of user input may be provided including, for example, the user input device described above.

The POI database 104 may be generated in various ways. The POI database 104 may be generated by the navigation system 100 including, for example, processing unit 105. As an example, the POIs for different categories and their map locations can be retrieved from a different POI database. For different selected map scales, map regions are defined, the edge size of which may for example scale inversely proportional to the map scale. For the map regions in which POIs of a particular category are located the number of POIs of the category in the respective map region is determined. If the number of POIs of the same category that are located in a map region is larger than a predetermined threshold number, a substitute POI of the same category is stored in the POI database in association with the map region. For the corresponding map scale the substitute POI now represents the POIs of the same category in the map region. The substitute POI is stored in association with a location determined by calculating a mean value or weighted mean value of the locations of the represented POIs. The database is built up in a tree structure by defining the POIs or substitute POIs of the largest size regions as root nodes and linking the root nodes to nodes storing the POIs or substitute POIs for the next smaller sized regions located within the region associated with the parent node. Thus, the tree structure illustrated in FIG. 5 is built up. It should be clear that there are several other ways of setting up a POI database including such a tree structure. As mentioned above, MBRs may be used to span fractions of POIs, the fractions of POIs being smaller at lower depth levels of the tree structure.

In summary, the navigation system provides several improvements to the displaying of points of interest on map data. Even at smaller overview map scales POIs of all the selected categories can be observed. Locating a suitable POI is thus facilitated for the user of the navigation device. Even at these smaller map scales, no overcrowding occurs in urban areas having a high density of POIs which is achieved by the use of the substitute POIs. Due to the structure of the database, POIs and substitute POIs can be retrieved fast and efficiently. As the substitute POIs are provided in the database, the navigation device itself does not need to calculate substitute POIs.

While various examples of the invention have been described, it will be apparent to those of ordinary skill in the art that many more examples and implementations are possible within the scope of the invention. Accordingly, the invention is not to be restricted except in light of the attached claims and their equivalents.

I claim:

1. A method of displaying Points of Interest (POIs) on a display of a navigation system configured to display maps at different map scales, the method comprising:

determining a map section to be displayed at a particular map scale on the display, the map section comprising a plurality of map regions each having a predetermined size;

accessing a database having stored POI data comprising a plurality of POIs and a substitute POI, a portion of the plurality of POIs comprising more than a threshold number of POIs located in a map region, the substitute POI being associated with the map region and representative of the portion of the plurality of POIs;

retrieving from the database a portion of the POI data associated with the map section to be displayed, where retrieving the portion of the POI data comprises retrieving the substitute POI instead of the portion of the plurality of POIs represented by the substitute POI in dependence on the particular map scale; and transmitting display data for receipt by the display, the display data indicative of the map section and retrieved POI data, where the substitute POI is transmitted for display as a substitute for the portion of the plurality of POIs represented by the substitute POI.

2. A method of displaying Points of Interest (POIs) on a display of a navigation system configured to display maps at different map scales, the method comprising:
   accessing a database having stored POI data comprising a plurality of POIs and at least one substitute POI, the substitute POI corresponding to a map region of a predetermined size in which more than a threshold number of POIs are located;
   determining a map section to be displayed at a particular map scale on the display;
   retrieving from the database a portion of the POI data associated with the map section to be displayed, where retrieving the portion of the POI data comprises retrieving the substitute POI instead of a portion of the plurality of POIs represented by the substitute POI in dependence on the particular map scale; and
   transmitting display data for receipt by the display, the display data indicative of the map section and retrieved POI data, where the substitute POI is transmitted for display as a substitute for the portion of the plurality of POIs represented by the substitute POI;
   where the POI data is stored in the database in a tree structure, each of the plurality of POIs and the substitute POI being stored in one of a plurality of nodes;
   where a parent node associated with the substitute POI is linked to a child node associated with at least part of the portion of the plurality of POIs represented by the substitute POI; and
   where the plurality of nodes are arranged in a series of depth levels of the tree structure, different depth levels corresponding to map regions of different predetermined sizes, one node associated with one substitute POI corresponding to one map region of one predetermined size being associated with one of the series of depth levels, and another node associated with another substitute POI corresponding to another map region of a different predetermined size being associated with another of the series of depth levels.

3. The method according to claim 2, where the retrieving of the POI data and the transmitting of the display data comprise the steps of:
   determining a root node of the tree structure for the map section to be displayed;
   performing a search for nodes linked to the determined root node, the search being stopped at a stopping depth level of the tree structure at which a distance between map locations of neighboring nodes is smaller than a minimum distance, which depends on the particular map scale;
   retrieving any of the plurality of POIs included in the searched tree structure at each depth level above the stopping depth level;
   retrieving any substitute POIs included in the searched tree structure at a depth level which is one level above the stopping depth level; and
   providing the retrieved POIs and substitute POIs for display as POI data.

4. The method according to claim 2, where the tree structure comprises a root node at a highest depth level of the tree structure, and a root substitute POI corresponding to a largest map region or a POI is stored in the root node, depending on a number of POIs located within the largest map region.

5. The method according to claim 2, where each node of a lowest depth level stores only POIs irrespective of a number of POIs located within any map region.

6. The method according to claim 1, further comprising the steps of:
   receiving a selection signal indicative of user selection of the substitute POI, which is displayed on the display; and
   providing a selection list of the portion of the plurality of POIs represented by the substitute POI.

7. The method according to claim 1, where the POI data in the database is arranged into a series of categories, and a fraction of the POI data associated with a particular category comprises a category substitute POI corresponding to a particular map region in which more than the threshold number of POIs of the particular category are located.

8. The method according to claim 7, further comprising determining at least one of the series of categories for which POIs are to be displayed, where, at an overview map scale, a segment of the POI data associated with all the determined categories is displayed.

9. The method according to claim 8, where the overview map scale is smaller than about 1:500,000.

10. The method according to claim 7, further comprising transmitting for display a segment of the POI data associated with at least one of the categories restaurants and gas stations at an overview map scale, if the respective category is selected to be displayed.

11. The method according to claim 2, where the one predetermined size of the one map region is larger than the different predetermined size of the other map region, and the one depth level is above the other depth level within the tree structure.

12. The method according to claim 2, where the one node is a parent of the other node within the tree structure and the other map region is at least partially included in the one map region.

13. The method according to claim 1, further comprising transmitting for display the substitute POI as a graphical symbol indicative of a number of POIs included in the portion of the plurality of POIs represented by the substitute POI.

14. A navigation system, comprising:
   a map unit adapted to determine a map section to be displayed at a particular map scale;
   a database adapted to store Point of Interest (POI) data comprising a plurality of POIs and at least one substitute POI, a portion of the plurality of POIs comprising more than a threshold number of POIs located in a map region at least partially included in the determined map section, the substitute POI stored in the database in association with the map region and representative of the portion of the plurality of POIs located within the map region;
   a retrieval unit adapted to retrieve from the database a portion of the POI data associated with the determined map section to be displayed, the substitute POI being retrieved instead of the portion of the plurality of POIs represented by the substitute POI in dependence on the particular map scale; and
   a display control unit adapted to transmit display data based on the determined map section and the retrieved POI data such that the substitute POI is transmitted as a substitute for the portion of the plurality of POIs represented by the substitute POI.

15. The navigation system according to claim 14, where the POI data is stored in the database in a tree structure, each of the plurality of POIs and the substitute POI being stored in one of a plurality of nodes, a parent node storing the substitute POI being linked to a child node storing at least part of the portion of the plurality of POIs represented by the substitute POI, and where the tree structure comprises a series of depth levels, one node storing one substitute POI associated with one map region of one predetermined size being associated with one of the series of depth levels, and another node storing another substitute POI associated with another map region of a different predetermined size being associated with another of the series of depth levels.

16. The navigation system according to claim 15, where the retrieval unit is configured to determine a root node of the tree structure for the map section to be displayed; perform a search for nodes linked to the determined root node, the search being stopped at a stopping depth level of the tree structure at which a distance between map locations of neighboring nodes is smaller than a minimum distance at a current map scale; retrieve any of the plurality of POIs included in the searched tree structure at each depth level above the stopping depth level; retrieve any substitute POIs included in the searched tree structure at a depth level which is at least one level above the stopping depth level; and provide the retrieved POIs and substitute POIs to the display control unit for display as POI data.

17. The navigation system according to claim 15, where the highest depth level of the tree structure comprises a root node, the root node storing a substitute POI corresponding to a largest map region.

18. The navigation system according to claim 15, where the tree structure comprises a lowest depth level, each node of the lowest depth level storing only POIs irrespective of a number of POIs located within any map region.

19. A tangible computer readable medium encoded with computer executable instructions, the computer executable instructions executable with a processor, the computer readable medium comprising:

a Point of Interest (POI) database comprising a plurality of POIs, each of the plurality of POIs belonging to one of a plurality of categories;

the POI database further comprising at least one substitute POI, the substitute POI being associated with a particular one of a plurality of map regions each having a predetermined size, more than a threshold number of POIs belonging to a particular one of the plurality of categories being located in the particular map region, the substitute POI representing a portion of the plurality of POIs belonging to the particular category and located within the particular map region.

20. A method of displaying Points of Interest (POIs) on a display in communication with a navigation system that is configured to display maps at different map scales, the method comprising:

determining a map section to be displayed on the display of the navigation system based on a selected map scale, the map section comprising a plurality of map regions each having a predetermined size;

providing a database configured to store POI data comprising a plurality of POIs and a plurality of substitute POIs;

storing the POI data in a tree structure comprising a plurality of nodes each corresponding to one of the plurality of map regions;

storing a particular one of the plurality of substitute POIs in a particular one of the plurality of nodes when more than a threshold number of POIs are located within a particular map region corresponding to the particular node;

retrieving from the database POI data stored in a portion of the plurality of nodes corresponding to a portion of the plurality of map regions that overlap the determined map section, at least one of the plurality of substitute POIs being retrieved as part of the POI data based on the selected map scale; and transmitting for display the map section and the retrieved POI data.

* * * * *